3,322,650
CONTROL OF RATIO OF RATE OF HEAT FLOW TO RATE OF FEED IN DISTILLATION RESPONSIVE TO BOTTOMS ANALYSIS
Thell L. Hillburn, Bartlesville, Okla., assignor to Phillips Petroleum Company, a corporation of Delaware
Filed Jan. 3, 1964, Ser. No. 335,619
4 Claims. (Cl. 203—1)

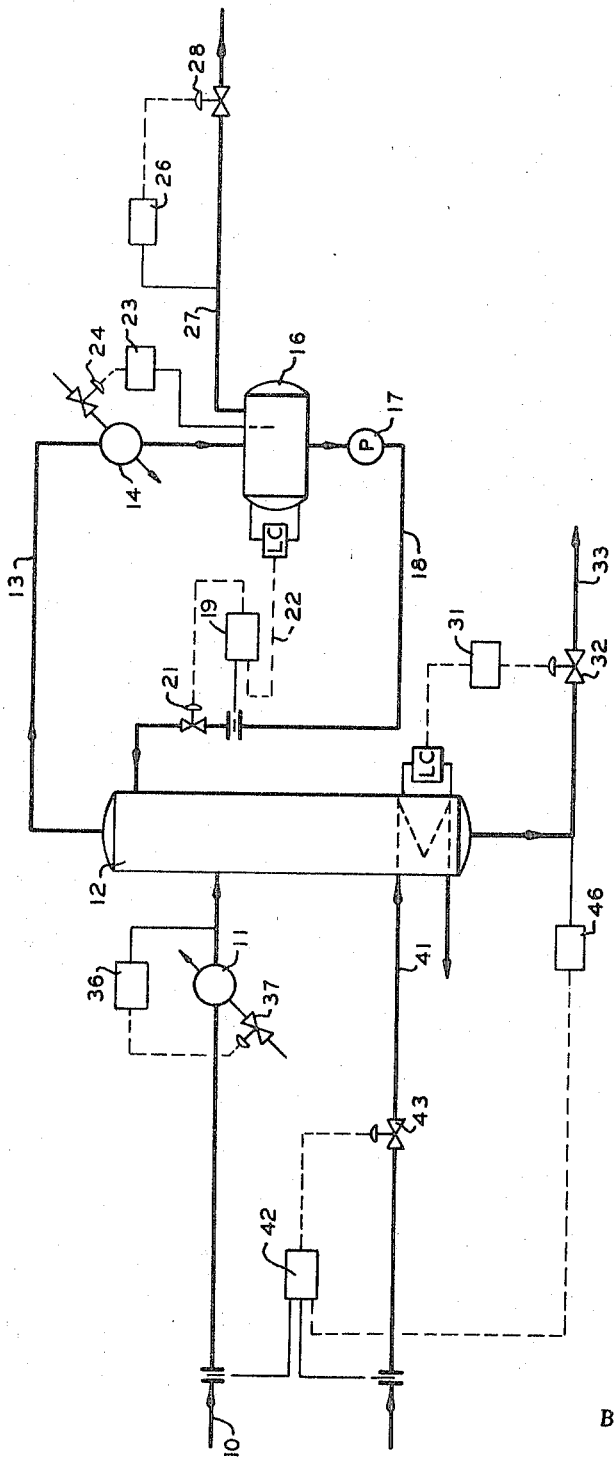

This invention relates to control of fractional distillation. In one aspect it relates to apparatus for controlling the operation of a fractional distillation column by maintaining a ratio of heating fluid to feed at a value determined in response to the concentration of a selected component in the kettle product. In another aspect the invention relates to a method for controlling a fractional distillation column by regulating the flow of the heating fluid for said column in a predetermined ratio with the feed to said column, and adjusting the ratio in response to the concentration of a selected component in the kettle product.

In the operation of a fractional distillation column, it is desirable to maintain the operation as nearly stable as possible to avoid unnecessary fluctuations in overhead and kettle products, and to permit continuous operation closer to the flood point, that is to utilize the column at maximum capacity. I have found that use of the method and apparatus described herein permits operation of a fractional distillation column at maximum capacity, while minimizing fluctuations and avoiding undesirable variation in the produce distribution in the overhead and kettle product removal lines.

An object of my invention is to improve control of a fractional distillation column.

Another object of my invention is to provide stable operation of a fractional distillation column.

Another object of my invention is to permit operation of a fractional distillation column at maximum capacity.

Other aspects, objects, and the advantages of my invention are apparent in the written description, the drawing and the claims.

According to my invention, a fractional distillation column is controlled by controlling the ratio of heating fluid to feed and adjusting the set point ratio in response to the analysis of the kettle product for a selected component. Further according to my invention there is provided fractional distillation apparatus and control means therefor including a feed conduit communicating with the column, a heating fluid conduit in heat exchange relation with the column, means to control the flow of fluid in the heating fluid conduit in response to the flow of fluid in the feed conduit to maintain a ratio of the two flows, and means to analyze the kettle product of the column for the concentration of a selected component and to adjust the controlled ratio in response to the kettle product analysis.

In the drawing a hydrocarbon to be fractionated is fed through pipe 10, and through heat exchanger 11, into fractionator 12. Overhead vapors from fractionator 12 pass through pipe 13, and condenser 14 into accumulator 16. Liquid from accumulator 16 is returned by pump 17 and pipe 18 to fractionator 12. The rate of flow of this liquid reflux is controlled by a flow controller 19 which controls valve 21. The set point of controller 19 is adjusted by the liquid level in accumulator 16 by the apparatus illustrated schematically at 22 so that the proper liquid level is maintained in accumulator 16. The temperature within accumulator 16 is controlled by controller 23 which regulates valve 24 of the cooling water to condenser 14. The flow of vapor from accumulator 16 is regulated by controller 26, which is sensitive to the pressure in vapor line 27 and regulates valve 28 to maintain the pressure constant.

The liquid level within the fractionator 12 is controlled by liquid level controller 31, which adjusts valve 32 in liquid drawoff line 33. The temperature of the feed is controlled by temperature controller 36, which adjusts valve 37 and thus controls the flow of heat exchange fluid through the exchanger 11 to maintain the temperature in the line 10 constant at a desired value.

The flow of steam to fractionator 12 through pipe 41 is controlled by a ratio controller 42 to adjust valve 43 to maintain the flow in pipe 41 at a constant desired ratio of the flow in pipe 10, subject to variation by the analysis of the kettle product.

A chromatographic analyzer 46 checks the amount of a specific component in the kettle product and adjusts the set point of controller 42 to maintain the proper analysis. For example when fractionator 12 is operated as a deethanizer on a natural gasoline stream, analyzer 46 continuously analyzes the kettle product for the concentration of ethane and adjusts the set point of controller 42. A suitable analyzer is described in U.S. 3,095,728. Other appropriate analyzer-controllers for the product being measured can be used.

It will be recognized that the drawing is schematic, and many conventional items of equipment commonly used in a plant are not shown, for example pumps, valves, etc., and the necessary additional equipment can be supplied by one skilled in the art, when needed.

Reasonable variation and modification are possible within the scope of my invention which sets forth method and apparatus for controlling the operation of a fractional distillation column by controlling the ratio of the flow of the heating fluid and the flow of the feed and controlling the ratio in response to the concentration of a selected component in the kettle product.

I claim:
1. Fractional distillation apparatus, comprising:
a fractional distillation column;
a feed conduit communicating with said column;
means to control the temperature of a feed in said feed conduit;
means to control the temperature of a feed in said feed conduit;
a heating fluid conduit in heat exchange relation with said column;
means to control the flow of a heating fluid in said heating fluid conduit in response to the flow of feed in said feed conduit to maintain a set point ratio of the flow of said heating fluid to the flow of said feed;
means to analyze kettle product of said column for the concentration of a selected component; and
means to adjust said set point ratio in response to the kettle product analysis to control said concentration.
2. Fractional distillation apparatus, comprising:
a fractional distillation column;
a feed conduit communicating with said column;
means to control the temperature of a feed in said feed conduit;
a heating fluid conduit in heat exchange relation with said column;
an overhead product withdrawal conduit connected with the upper portion of said column;
condensing means for said overhead product withdrawal conduit;
an accumulator for said overhead product;
a vapor withdrawal conduit from said accumulator;
pressure control means in said vapor withdrawal conduit;
a reflux conduit communicating with said accumulator in the liquid phase portion thereof;

means to control the flow in said reflux conduit in response to the liquid level in said accumulator to maintain said liquid level at a desired point;

a kettle product withdrawal conduit communicating with the lower portion of said column;

means to control the flow in said kettle product withdrawal conduit in response to the liquid level in said column to maintain said liquid level at a desired point;

means to control the flow of a heating fluid in said heating fluid conduit in response to the flow of feed in said feed conduit to maintain a set point ratio of flow of said heating fluid to the flow of said feed;

means to analyze the kettle product of said column for the concentration of a selected component; and means to adjust said set point ratio in response to the kettle product analysis to control said concentration.

3. A method for controlling the operation of a fractional distillation column, comprising the steps of:

passing a feed into said column;
controlling the temperature of said feed;
passing a heating fluid in heat exchange relation with said column;
measuring the flow of said feed and producing a first signal proportional thereto;
measuring the flow of said heating fluid and producing a second signal proportional thereto;
controlling the flow of said heating fluid in response to said first and second signals to maintain a predetermined ratio of the flow of said heating fluid to the flow of said feed;
analyzing kettle product of said column and producing a third signal proportional to the concentration of a selected component therein; and
adjusting said ratio in response to said third signal.

4. A method for controlling the operation of a fractional distillation column, comprising the steps of:

passing a feed into said column;
controlling the temperature of said feed;
removing an overhead product from said column;
condensing said overhead product by flow of cooling fluid and accumulating said overhead product;
controlling the temperature of said accumulated product by controlling the flow of said cooling fluid;
withdrawing vapor from said accumulated product;
controlling the pressure of said accumulated product by controlling the withdrawal of said vapor;
returning accumulated liquid from said overhead product to said column as reflux;
controlling the rate of flow of said reflux in response to the liquid level of the accumulated product in an accumulator;
removing a kettle product from said column;
controlling the rate of withdrawal of said kettle product in response to the liquid level in said column to maintain said liquid level;
passing a heating fluid in heat exchange relation with said column;
measuring the flow of said feed and producing a first signal proportional thereto;
measuring the flow of said heating fluid and producing a second signal proportional thereto;
controlling the flow of said heating fluid in response to said first and second signals to maintain a predetermined ratio of the flow of said heating fluid to the flow of said feed;
analyzing the kettle product of said column and producing a third signal proportional to the concentration of a seelcted component; and
adjusting said ratio in response to said third signal.

References Cited

UNITED STATES PATENTS

| | | | |
|---|---|---|---|
| 2,749,281 | 6/1956 | Ferro | 203—3 |
| 2,868,701 | 1/1959 | Berger | 202—160 |
| 2,890,156 | 6/1959 | Vautrain | 202—160 |
| 2,900,312 | 8/1959 | Gilmore | 202—160 |
| 2,977,289 | 3/1961 | Kron | 202—160 |
| 3,085,153 | 4/1963 | Morgan | 203—3 |
| 3,111,460 | 11/1963 | Orr | 203—3 |
| 3,150,064 | 9/1964 | Dobson | 202—160 |

NORMAN YUDKOFF, *Primary Examiner.*

WILBUR L. BASCOMB, JR., *Examiner.*